(12) United States Patent
Han et al.

(10) Patent No.: US 11,334,984 B2
(45) Date of Patent: May 17, 2022

(54) ANALYSIS METHOD FOR CRACK RATE OF ELECTRODE ACTIVE MATERIAL OF ELECTRODE FOR LITHIUM SECONDARY BATTERY

(71) Applicant: LG CHEM, LTD., Seoul (KR)

(72) Inventors: Jung Hoon Han, Daejeon (KR); Joo Yul Baek, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 51 days.

(21) Appl. No.: 16/922,490

(22) Filed: Jul. 7, 2020

(65) Prior Publication Data

US 2021/0012483 A1    Jan. 14, 2021

(30) Foreign Application Priority Data

Jul. 10, 2019 (KR) .................... 10-2019-0083129

(51) Int. Cl.
*G01N 1/44* (2006.01)
*G06T 7/00* (2017.01)
*H01M 4/04* (2006.01)

(52) U.S. Cl.
CPC .............. *G06T 7/0004* (2013.01); *G01N 1/44* (2013.01); *H01M 4/0416* (2013.01); *G06T 2207/10061* (2013.01)

(58) Field of Classification Search
CPC ........ G06T 7/0004; G06T 2207/10061; G01N 1/44; G01N 23/2202; G01N 23/2251;
(Continued)

(56) References Cited

U.S. PATENT DOCUMENTS 9,793,183 B1 * 10/2017 Ho ................... H01L 22/20
2014/0064596 A1 * 3/2014 He .................... G06T 7/0006
382/141
(Continued)

FOREIGN PATENT DOCUMENTS

KR    10-2017-0006663 A    1/2017
KR    10-2017-0019146 A    2/2017
(Continued)

OTHER PUBLICATIONS

"Why Magnification is Irrelevant in Modern Scanning Electron Microscopes Application Note Introduction", Agilement Technologies, Jul. 5, 2011, Retrieved from the Internet: URL: http://www.toyo.co.jp/files/user/img/product/microscopy/pdf/5990-8594EN.pdf, 8 pages.
(Continued)

*Primary Examiner* — Sheela C Chawan
(74) *Attorney, Agent, or Firm* — Dentons US LLP

(57) ABSTRACT

Provided is an analysis method for a crack rate of an electrode active material of an electrode, comprising the steps of: forming an electrode including an electrode active material, a binder, and a conductive material; impregnating the electrode with a resin and visualizing material regions including the electrode active material, the binder, and the conductive material which are included in the electrode, and a pore region; cutting the electrode and forming an electrode cross-section sample; photographing a cross section of the electrode cross-section sample using a scanning electron microscope and obtaining a cross-sectional image; performing primary image processing on the cross-sectional image and extracting total surface area pixels of the electrode active material; performing secondary image processing on the cross-sectional image and extracting total boundary pixels of the electrode active material; and calculating a
(Continued)

crack rate of the electrode active material of the electrode in the cross-sectional image.

6 Claims, 7 Drawing Sheets

(58) Field of Classification Search
CPC ........ G01N 1/04; H01M 4/0416; H01M 4/02; H01M 4/13; H01M 4/621; H01M 4/0447; H01M 4/139; H01M 10/052; Y02E 60/10
USPC .................................................. 382/152, 100
See application file for complete search history.

(56) References Cited

U.S. PATENT DOCUMENTS

| | | | |
|---|---|---|---|
| 2017/0084016 A1* | 3/2017 | Chen | G06T 7/001 |
| 2020/0105629 A1* | 4/2020 | Chen | G03F 7/70633 |
| 2020/0141841 A1 | 5/2020 | Han | |

FOREIGN PATENT DOCUMENTS

| | | |
|---|---|---|
| KR | 10-2018-0005060 A | 1/2018 |
| KR | 10-1875708 B1 | 8/2018 |
| KR | 10-2018-0130462 A | 12/2018 |
| WO | 2018/221929 A1 | 12/2018 |

OTHER PUBLICATIONS

Exner, Hans Eckart et al., "Messen und Ausgabe", Einführung in die Quantitative Gefügeanalyse, Deutsche Gesellschaft für Metallkunde, Jan. 1, 1986, pp. 75-76.

"Sample Preparation Techniques for Microscopic Analysis in Metallurgy", Thermo Fisher Scientific Phenom-World BV, Mar. 7, 2014, Retrieved from the Internet: URL:https://www.azom.com/article.aspx?ArticleiD=10711, 8 pages.

AzoM, "Grain Size Analysis-Electron Backscatter Diffraction, Channelling Contrast Imaging and Other Techniques", Oct. 11, 2002, Retrieved from the Internet: URL:https://www.azom.com/article.aspx?ArticleiD=1694, 7 pages.

Nanhee Im et al., "A Study on the Quantitative Evaluation Method of Fold Cracking of Coated Paper", Journal of Korea TAPPI, vol. 49, No. 5, 2017, pp. 20-27.

Martin Ebner et al., "Visualization and Quantification of Electrochemical and Mechanical Degradation in Li Ion Batteries", Science, vol. 342, 2013, pp. 716-720.

Juchuan Li et al., "Crack Pattern Formation in Thin Film Lithium-Ion Battery Electrodes", Journal of the Electrochemical Society, vol. 158, Issue 6, pp. A689-A694.

* cited by examiner

ANALYSIS METHOD FOR CRACK RATE OF ELECTRODE ACTIVE MATERIAL OF ELECTRODE FOR LITHIUM SECONDARY BATTERY

CROSS-REFERENCE TO RELATED APPLICATION

The present application claims priority to and the benefit of Korean Patent Application No. 2019-0083129, filed on Jul. 10, 2019, the disclosures of which are incorporated herein by reference in their entirety.

FIELD

The present invention relates to an analysis method for a crack rate of an electrode active material of an electrode for a lithium secondary battery.

BACKGROUND

As technology development and demand for mobile devices increase, a demand for secondary batteries of the mobile devices as energy sources is rapidly increasing. Among these secondary batteries, lithium secondary batteries having high energy density and voltage, a long cycle lifetime, and a low self-discharge rate are commercialized and widely used.

In designing such a lithium secondary battery, there are various factors influencing the performance of the lithium secondary battery, which include a type of a raw material, such as an electrode active material, a binder, a conductive material, or an electrolyte solution, and combinations of the above-described raw materials, an amount of use thereof, dispersion of constituent materials, and a crack of an active material.

The crack of the electrode active material deepens as the cycle of the lithium secondary battery progresses, and an area increases in which the electrode active material can react with the electrolyte solution as an area of the crack of the electrode active material increases, thereby accelerating a degeneration rate of the electrode, and an amount of gas generated due to the electrode degeneration increases. Therefore, among the above factors, the crack of the electrode active material is an important factor that greatly affects occurrence of swelling of the electrode.

However, until now, a difference in degree of cracking of electrode active materials has been analyzed by simply comparing only images without quantitative comparison.

Therefore, in developing a new electrode, there is a need for a comparative analysis method capable of quantifying and comparing a difference in degree of cracking of electrode active materials under various conditions.

(Non-patent Document 1) Crack pattern formation in thin film lithium-ion battery electrodes, Journal of the Electrochemical Society, 158(6).

SUMMARY

The present invention is directed to providing an analysis method by which, after an electrode is formed, a degree of cracking of an electrode active material included in the electrode caused by charging/discharging or pressure is quantitatively determined.

According to an aspect of the present invention, there is provided an analysis method for a crack rate of an electrode active material of an electrode for a secondary battery, which is an analysis method for quantifying a degree of cracking of an electrode active material, and the analysis method includes a first step of forming an electrode including an electrode active material, a binder, and a conductive material, a second step of visualizing material regions including the electrode active material, the binder, and the conductive material which are included in the electrode, and a pore region by impregnating the electrode with a resin, a third step of forming an electrode cross-section sample by cutting the electrode, a fourth step of obtaining a cross-sectional image by primarily photographing a cross section of the electrode cross-section sample, a fourth-first step of extracting total surface area pixels of the electrode active material by performing primary image processing on the cross-sectional image, a fourth-second step of extracting total boundary pixels of the electrode active material by performing secondary image processing on the cross-sectional image, and a fifth step of calculating a crack rate of an electrode active material of the electrode in the cross-sectional image using Equation 1, $$\text{A crack rate (\%) of an electrode active material} = \{(\text{total boundary pixels of the electrode active material which are extracted from a second cross-sectional image}/\text{total surface area pixels of the electrode active material which are extracted from a first cross-sectional image}) \times 100\}. \quad [\text{Equation 1}]$$

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION

Figure 1A:
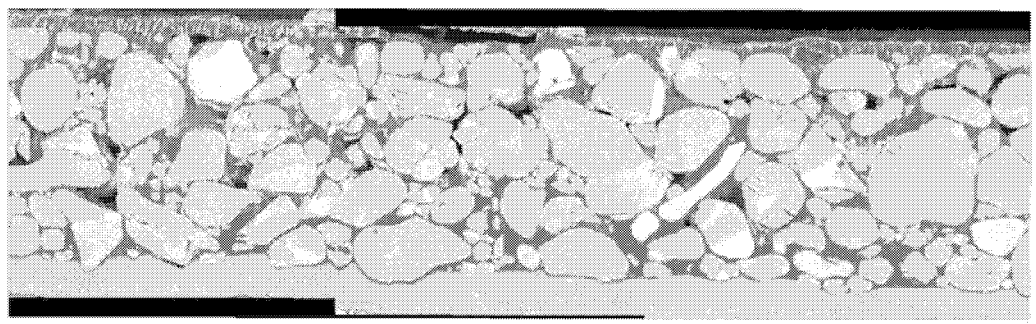
FIG. 1A is a cross-sectional scanning electron microscope (SEM) image of an electrode for a secondary battery according to an embodiment of the present invention.

Hereinafter, the present invention will be described in more detail.

Terms and words used in this specification and claims should not be interpreted as limited to commonly used meanings or meanings in dictionaries and should be interpreted with meanings and concepts which are consistent with the technological scope of the present invention based on the principle that the inventors have appropriately defined concepts of terms in order to describe the present invention in the best way.

Analysis Method for Crack Rate of Electrode Active Material of Electrode for Lithium Secondary Battery An analysis method for a crack rate of an electrode active material of an electrode for a secondary battery according to an embodiment of the present invention includes a first step of forming an electrode including an electrode active material, a binder, and a conductive material, a second step of visualizing material regions including the electrode active material, the binder, and the conductive material which are included in the electrode, and a pore region by impregnating the electrode with a resin, a third step of forming an electrode cross-section sample by cutting the electrode, a fourth step of obtaining a cross-sectional image by primarily photographing a cross section of the electrode cross-section sample, a fourth-first step of extracting total surface area pixels of the electrode active material by performing primary image processing on the cross-sectional image, a fourth-second step of extracting total boundary pixels of the electrode active material by performing secondary image processing on the cross-sectional image, and a fifth step of calculating a crack rate of an electrode active material of the electrode in the cross-sectional image using Equation 1.

A crack rate (%) of an electrode active material={(total boundary pixels of the electrode active material which are extracted from a second cross-sectional image/total surface area pixels of the electrode active material which are extracted from a first cross-sectional image)× 100}  [Equation 1]

Hereinafter, the above analysis method will be described in more detail.

First, the electrode including the electrode active material, the binder, and the conductive material is prepared (in the first step).

The electrode may be formed by a known method of forming an electrode. For example, the electrode may be formed by preparing an active material slurry including an active material, a binder, and a conductive material, and then applying the prepared active material slurry onto an electrode current collector, and drying and rolling the electrode current collector.

The electrode current collector is not particularly limited as long as it has conductivity without causing a chemical change in the battery. The electrode current collector may include, for example, a material such as stainless steel, aluminum, nickel, titanium, baked carbon, or a material obtained by surface-treating an aluminum or stainless steel surface with carbon, nickel, titanium, silver, or the like. Further, the electrode current collector may typically have a thickness of 3 to 500 µm and may form fine uneven portions on a surface of the electrode current collector to increase adhesion of the active material. The electrode current collector may be used in various forms, for example, as a film, a sheet, a foil, a net, a porous body, a foam, and a non-woven fabric.

The electrode active material may be a positive electrode active material or a negative electrode active material. For example, when the electrode active material is a positive electrode active material, any electrode active material as long as it is typically used as a positive electrode active material is applicable as the positive electrode active material without any specific limitation. Specifically, the positive electrode active material may include layered compounds such as lithium cobalt oxide ($LiCoO_2$) and lithium nickel oxide ($LiNiO_2$) or compounds substituted with one or more transition metals, lithium manganese oxides represented by $Li_{1+y1}Mn_{2-y1}O_4$ ($0 \leq y1 \leq 0.33$), $LiMnO_3$, $LiMn_2O_3$, and $LiMnO_2$, a lithium copper oxide ($Li_2CuO_2$), vanadium oxides such as $LiV_3O_8$, $LiFe_3O_4$, $V_2O_5$, and $Cu_2V_2O_7$, an Ni site type lithium nickel oxide represented by $LiNi_{1-y2}M_{y2}O_2$ (here, M denotes at least one selected from the group consisting of Co, Mn, Al, Cu, Fe, Mg, B, and Ga, and $0.01 \leq y2 \leq 0.3$), a lithium manganese composite oxide represented by $LiMn_{2-y3}M_{y3}O_2$ (here, M denotes at least one selected from the group consisting of Co, Ni, Fe, Cr, Zn, and Ta, and $0.01 \leq y3 \leq 0.1$) or $Li_2Mn_3MO_8$ (here, M denotes at least one selected from the group consisting of Fe, Co, Ni, Cu, and Zn), and $LiMn_2O_4$ in which a part of lithium is substituted with alkaline earth metal ions, but the present invention is not limited thereto.

For example, when the electrode active material is a negative electrode active material, a compound capable of reversible intercalation and deintercalation of lithium may be used as the negative electrode active material. As a specific example, the electrode active material may include carbonaceous materials such as artificial graphite, natural graphite, graphitized carbon fiber, and amorphous carbon, metallic compounds capable of alloying with lithium, such as Si, Al, Sn, Pb, Zn, Bi, In, Mg, Ga, Cd, an Si alloy, an Sn alloy, or an Al alloy, metal oxides capable of doping and undoping lithium, such as $SiO_\beta$ ($0<\beta<2$), $SnO_2$, vanadium oxide, or lithium vanadium oxide, and a composite containing the above metallic compounds and carbonaceous material, such as an Si—C composite or an Sn—C composite, and may include one of the above materials or a mixture of two or more of the above materials. Further, a metal lithium thin film may be used as the negative electrode active material. In addition, both low crystalline carbon and high crystalline carbon may be used as the carbon material. Soft carbon and hard carbon are representative examples of the low crystalline carbon, and high-temperature calcined carbon, such as amorphous, plate-like, scale-like, spherical, or fibrous natural graphite or artificial graphite, kish graphite, pyrolytic carbon, mesophase-pitch-based carbon fiber, meso-carbon microbeads, mesophase pitches, and petroleum or coal tar pitch derived cokes, are representative examples of the high crystalline carbon.

The conductive material is used to impart conductivity to the electrode, and any material as long as it does not cause a chemical change in the configured battery and has conductivity may be used as the conductive material without any specific limitation. As a specific example, the conductive material may include graphite such as natural graphite and artificial graphite, carbon-based materials such as carbon black, acetylene black, Ketjen black, channel black, furnace black, lamp black, summer black, and carbon fibers, metal powders or metal fibers such as copper, nickel, aluminum, and silver, a conductive whisker such as zinc oxide and potassium titanate, a conductive metal oxide such as titanium oxide, and a conductive polymer such as polyphenylene derivative and may include one of the above materials or a mixture of two or more of the above materials.

The binder serves to improve adhesion between particles of the positive electrode active material, and adhesion between the positive electrode active material and the positive electrode current collector. As a specific example, the binder may include polyvinylidene difluoride (PVDF), polyvinylidenefluoride-co-hexafluoropropylene (PVDF-co- HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, ethylene propylene diene monomer (EPDM), sulfonated-EPDM, styrene-butadiene rubber (SBR), fluorine rubber, and various copolymers thereof, and may include one of the above materials or a mixture of two or more of the above materials.

Subsequently, the electrode is impregnated with a resin, and the material regions including the electrode active material, the binder, and the conductive material which are included in the electrode, and the pore region are visualized (in the second step).

The resin may be an epoxy-based resin.

Figure 3:
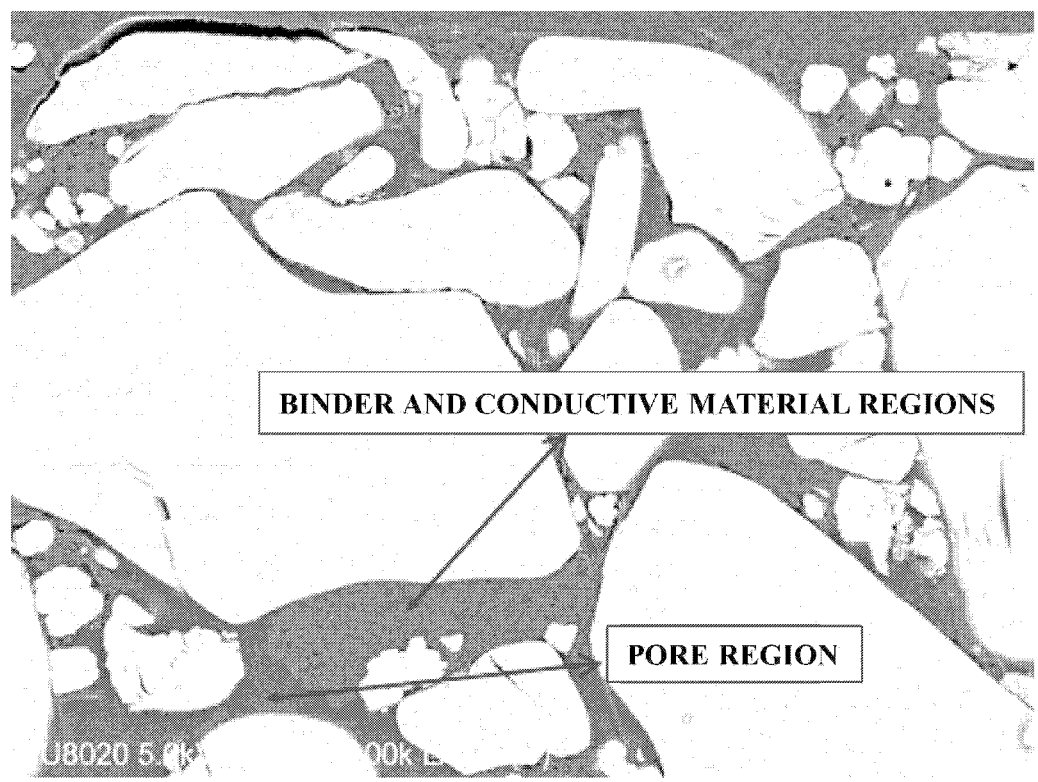
FIG. 3 is a cross-sectional SEM image obtained by photographing a positive electrode formed as Manufacturing Example 1 after the positive electrode is impregnating with an epoxy-based resin and then material regions and a pore region are visualized.
Figure 4:
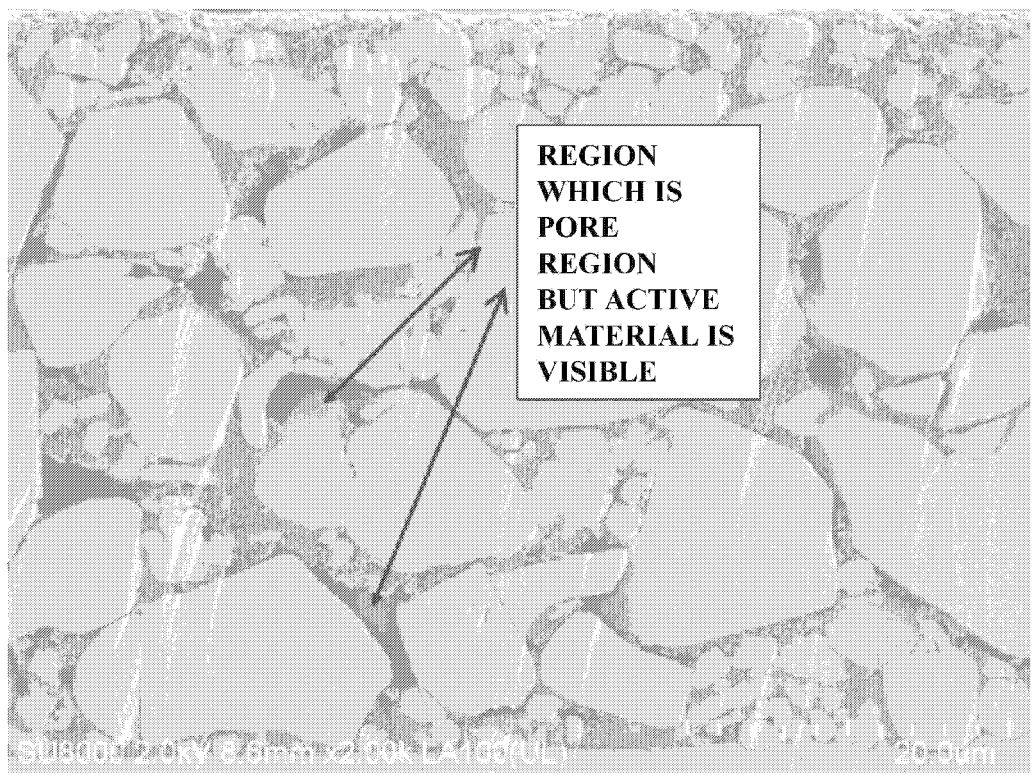
FIG. 4 shows a cross-sectional SEM image of a positive electrode formed as Manufacturing Example 1.

For example, when the electrode is impregnated with the epoxy-based resin, the material regions including the electrode active material, the conductive material, and the binder which are included in the electrode, and the pore region included in the electrode may be visualized, as shown in FIG. 3, due to a difference in intensity of contrast caused by a difference between a high atomic number of a transition metal element contained in the electrode active material and an atomic number of carbon and oxygen contained in the epoxy-based resin. As a result, a boundary between the electrode active material and the pores may be clearly distinguished, and thus a crack rate of the electrode active material may be more accurately calculated. Conversely, when the electrode is not impregnated with the resin, it can be seen that the material regions and the pore region are not clearly distinguished, as shown in FIG. 4.

Subsequently, the electrode cross-section sample is formed by cutting the electrode (in the third step).

The cutting of the electrode may be performed by irradiating the electrode with an argon ion beam of an ion milling device. For example, a focused ion beam generated by an ion gun may be applied to a surface of a sample via a mask.

By irradiating the electrode for a secondary battery with the ion beam generated by the ion gun of the ion milling device, the materials of the electrode may be sputtered. Accordingly, an electrode cross-section sample having a clean cross section without physical damage may be formed. Since the electrode cross-section sample is formed cleanly without physical damage, the electrode active material, the conductive material, the binder, and the pores of the electrode for a secondary battery may be more clearly distinguished.

For example, an ion beam current of the ion milling device may range from 10 μA to 250 μA, preferably from 100 μA to 230 μA, and most preferably from 130 μA to 210 μA. It is possible to shorten a formation time of the electrode cross-section sample by adjusting the ion beam current of the ion milling device to the above-described range. In addition, it is possible to form an electrode sample having a cleaner cross section by preventing a phenomenon in which the materials of the electrode are redeposited on the electrode cross-section sample.

Subsequently, a cross-sectional image is obtained by photographing the cross section of the electrode cross-section sample using a scanning electron microscope (SEM) (in the fourth step).

The cross-sectional image obtained in the fourth step is subjected to primary image processing using image processing software (e.g., AVIZO software) and the total surface area pixels of the electrode active material are extracted (in the fourth-first step).

After the total surface area pixels of the electrode active material in the cross-sectional image are extracted in the fourth-first step, the cross-sectional image is subjected to secondary image processing and the total boundary pixels of the electrode active material are extracted (in the fourth-second step).

Figure 1B:
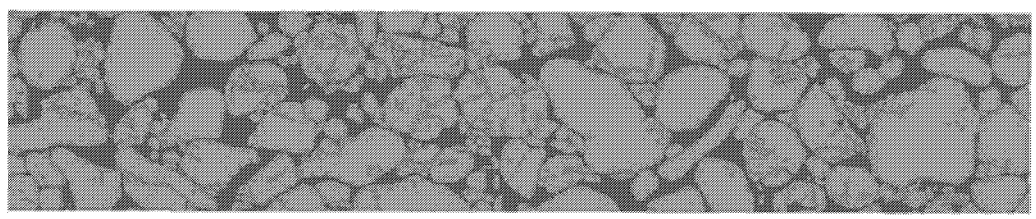
FIG. 1B is an image on which primary image processing is performed.
Figure 1C:
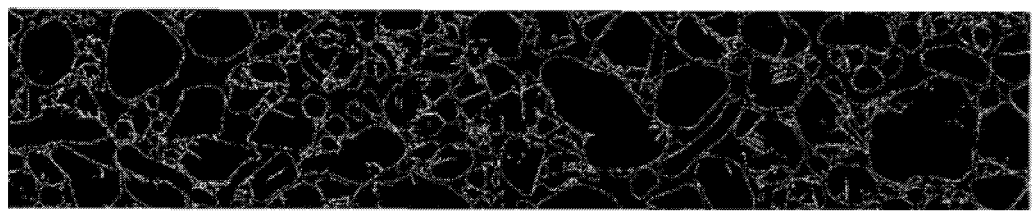
FIG. 1C is an image on which secondary image processing is performed.

In this regard, FIG. 1 shows cross-sectional images of an electrode cross-section sample according to an embodiment of the present invention. Specifically, FIG. 1A shows a cross-sectional SEM image of the electrode, FIG. 1B shows an image on which primary image processing is performed, and FIG. 1C shows an image on which secondary image processing is performed. More specifically, FIG. 1B shows an image displaying an extracted electrode active material, and FIG. 1C shows an image on which a boundary of the electrode active material is extracted on the basis of the electrode active material.

Referring to FIG. 1A, in the SEM image of the electrode cross-section sample, a gray portion represents the electrode active material, a black portion represents the pores, and a dark gray portion represents the binder and/or the conductive material.

When the primary image processing is performed after the electrode active material is clearly distinguished from the binder, the conductive material, and the pores as shown in FIG. 1A, the electrode active material region may be clearly distinguished from the other regions including the binder, the conductive material, and the pores. Specifically, the electrode active material display region and the other regions including the conductive material, the binder, and the pores may be easily extracted by the primary image processing, as shown in FIG. 1B. In addition, the electrode active material region may be clearly distinguished from the other regions, and thus the surface area of the electrode active material may also be easily measured.

Further, by performing the secondary image processing after the surface area of the electrode active material is measured, the boundary pixels of the electrode active material may be extracted, as shown in FIG. 1C, and thus the crack rate of the electrode active material may be easily calculated using the extracted pixels.

Finally, based on data extracted in the above-described fourth step, the crack rate of the electrode active material of the electrode in the cross-sectional image is calculated using Equation 1 below (in the fifth step).

$$A \text{ crack rate (\%) of an electrode active material} = \{(\text{total boundary pixels of the electrode active material which are extracted from the cross-sectional image}/\text{total surface area pixels of the electrode active material which are extracted from a cross-sectional image}) \times 100\} \quad \text{[Equation 1]}$$

In Equation 1, the total boundary pixels of the electrode active material which are extracted from the cross-sectional image refer to a total circumference of the boundary of the electrode active material and the crack area included in the electrode active material.

Figure 2A:
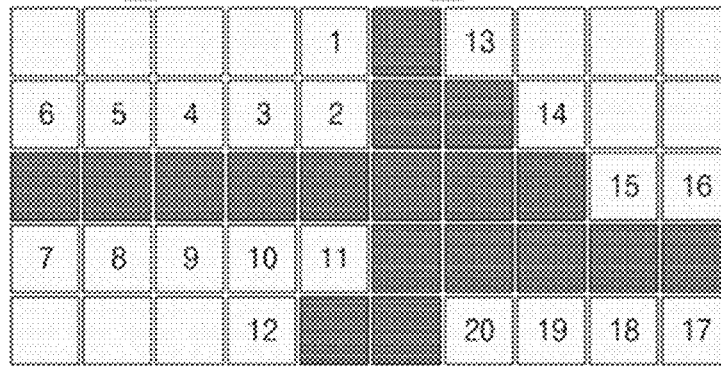
FIG. 2A and FIG. 2B are schematic diagrams showing definitions of a crack rate of a positive electrode active material according to an embodiment of the present invention.
Figure 2B:
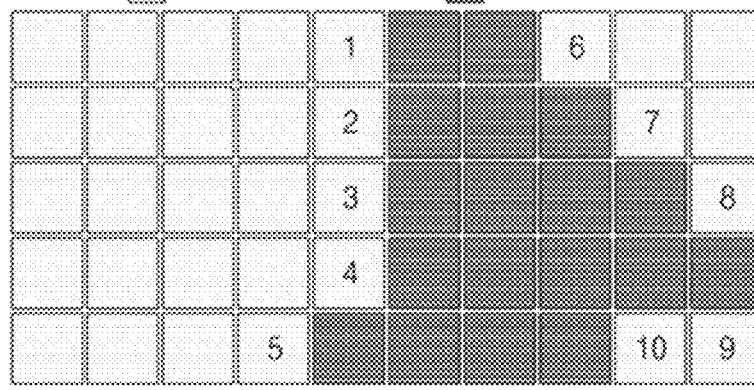

The crack rate of the electrode active material according to the embodiment of the present invention indicates a degree of cracking of electrode active material particles of an electrode active material layer. As shown in FIGS. 2A and 2B, even when pores of the same pixel are generated in the same region, the crack rate of the electrode active material varies according to positions of the pores in the electrode active material.

Accordingly, when an entire region of the electrode active material and a crack region of the electrode active material are accurately extracted as in the present invention, the crack rate of the electrode active material may be clearly analyzed, and thus electrode degeneration occurring when manufacturing the battery may also be accurately predicted using the crack rate.

Further, according to another embodiment of the present invention, an analysis method may further include a first-first step of pressing the electrode formed in the first step described above. The crack rate of the electrode active material included in the electrode formed in the first-first step may be calculated by performing the subsequent second to fifth steps.

For example, when the electrode formed in the first step is pressurized, a phenomenon in which the electrode active material is cracked may occur more prominently, and a crack rate of the electrode active material generated in manufacturing the electrode before charging or discharging may be analyzed.

Meanwhile, according to another embodiment of the present invention, the analysis method may include a step of forming an electrode including an electrode active material, a binder, and a conductive material (step A), a step of manufacturing a secondary battery including the electrode (step B), and a step of charging or discharging the secondary battery with a driving voltage of 3.0 to 4.2 V and then separating the electrode from the secondary battery (step C). The crack rate of the electrode active material may be calculated by performing the second to fifth steps described above on the separated electrode.

By comparing the crack rate of the electrode active material before charging or discharging to the crack rate of the electrode active material after charging or discharging, the crack rate of the electrode active material generated before or after charging or discharging may be clearly analyzed.

Hereinafter, examples will be described in detail to specifically describe the present invention. However, the examples of the present invention may be modified into several different forms, and the scope of the present invention is not limited to the examples described below. The examples of the present invention are provided in order to fully explain the present invention to those skilled in the art.

EXAMPLES

Manufacturing Example 1

$LiCoO_2$ as a positive electrode active material, a viscous conductive material, and a PVDF binder were mixed in a weight ratio of 94:3:3, the mixture was mixed in an N-methylpyrrolidone (NMP) solvent, and a composition for forming a positive electrode was prepared. The composition for forming a positive electrode was applied onto an aluminum current collector having a thickness of 10 μm, dried, and roll-pressed, and thus a positive electrode was formed.

Manufacturing Example 2

Graphite, a carbon black conductive material (super-C), and an SBR binder were mixed in a weight ratio of 95:2:3, the mixture was added into distilled water serving as a solvent, and thus a negative electrode active material slurry was prepared. The negative electrode active material slurry was applied onto a copper current collector having a thickness of 12 μm, dried, and roll-pressed, and thus a negative electrode was formed. The positive electrode formed as Manufacturing Example 1 was used after being pressurized. The pressurized positive electrode and the negative electrode formed above were laminated together with a polyethylene separation film so that a secondary battery was manufactured in a conventional manner. Thereafter, the secondary battery was placed in a battery case, and an electrolyte solution in which 1M of $LiPF_6$ was dissolved in a carbon-based solvent was injected, and thus the secondary battery was manufactured.

Example 1

The positive electrode formed as Manufacturing Example 1 was impregnated with an epoxy-based resin (EpoFix of Struers Co.), and material regions including an electrode active material, a binder, and a conductive material which are included in the electrode and a pore region were visualized. Subsequently, a positive electrode cross-section sample was formed by cutting the positive electrode using an ion milling device (IM 4000 in Hitachi Co.).

Subsequently, the positive electrode cross-section sample was photographed using a SEM (Hitachi SU-8020) to obtain a first cross-sectional image of the positive electrode, and then image processing (AVIZO software) was performed on the first cross-sectional image to derive a quantitative result value of total surface area pixels of the positive electrode active material.

Subsequently, the image processing (AVIZO software) was re-performed on the first cross-sectional image to derive a quantitative result value of total boundary pixels of the positive electrode active material.

Example 2

Except for pressing and using the positive electrode formed as Manufacturing Example 1, a crack rate of a positive electrode active material included in the positive electrode was measured using the same method as that in Example 1 above.

Example 3

After the secondary battery manufactured as Manufacturing Example 2 was fully charged to a voltage of 4.2 V with a constant current of 1 C, the secondary battery was discharged to a voltage of 3 V with a constant current of 1 C. It is assumed that this charging and discharging behavior is 1 cycle, and after repeating the cycle 200 times, the positive electrode was separated from the secondary battery. A crack rate of the positive electrode active material included in the positive electrode separated after the charging and discharging cycles was measured using the same method as that in Example 1.

Experimental Example 1: Confirmation of Surface Properties of Positive Electrode Active Material The crack rates of the positive electrode active materials included in the electrodes formed as Examples 1 to 3 and Manufacturing Example 2 described above were analyzed, and cross-sectional properties of the positive electrode active materials are shown in FIGS. 5 to 7.

Figure 5:
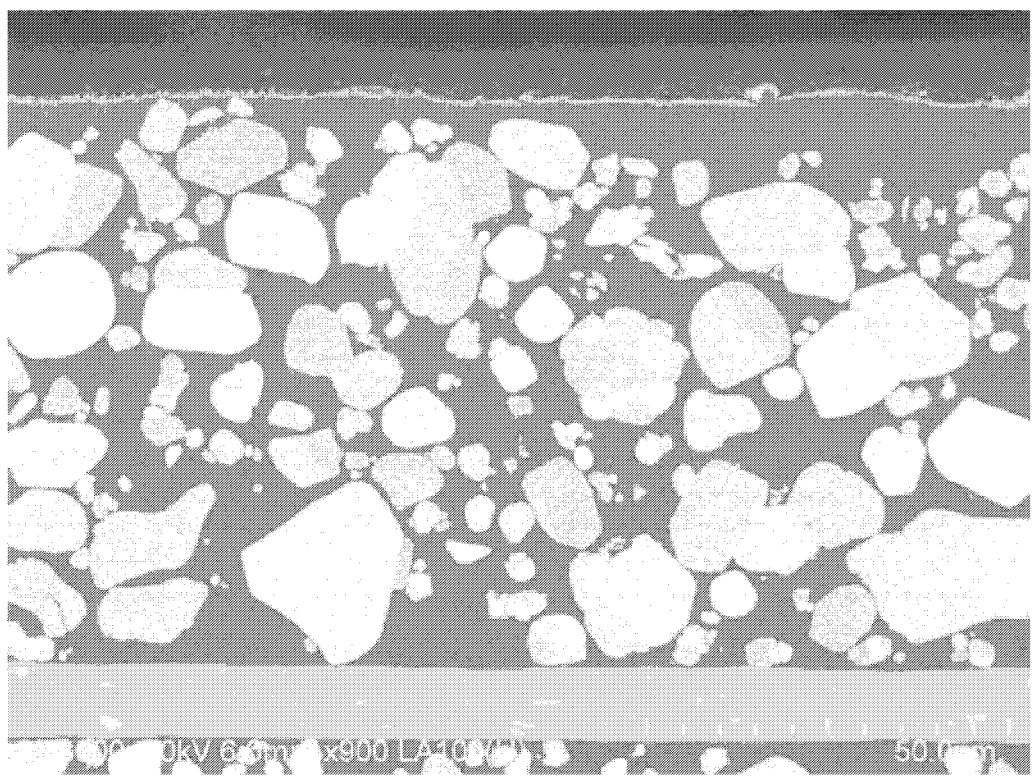
FIG. 5 shows a cross-sectional SEM image of a positive electrode formed as Example 1.
Figure 6:
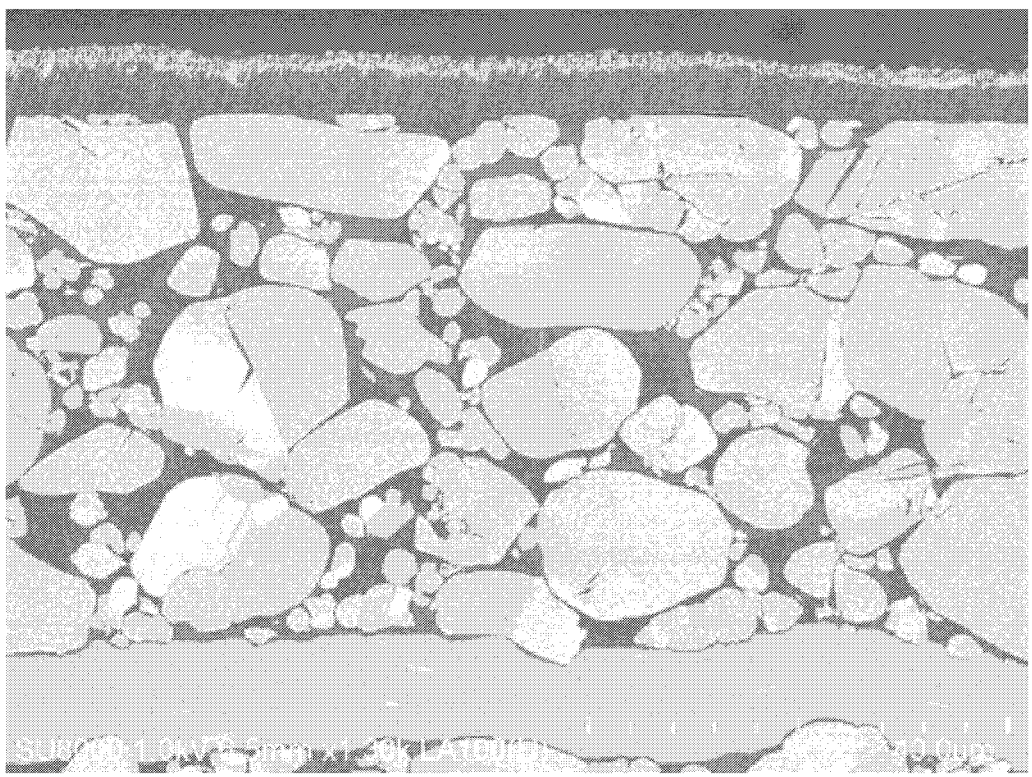
FIG. 6 shows a cross-sectional SEM image of a positive electrode formed as Example 2.

Specifically, as in Examples 1 and 2, the cross-sectional SEM photographs of the positive electrode active materials, which were obtained before and after the pressurization of the positive electrode, are shown in FIGS. 5 and 6. As in Examples 2 and 3, the cross-sectional SEM photographs of the positive electrode active materials included in the secondary battery, which were obtained before and after charging and discharging cycles of the secondary battery, are shown in FIGS. 6 and 7.

As shown in FIGS. 5 and 6, referring to the cross sections of the positive electrode active materials included in the positive electrodes after the pressurization of the positive electrode, it can be seen that more cracks were generated in the positive electrode active material after the pressurization (see FIG. 6) than before the pressurization (see FIG. 5).

Figure 7:
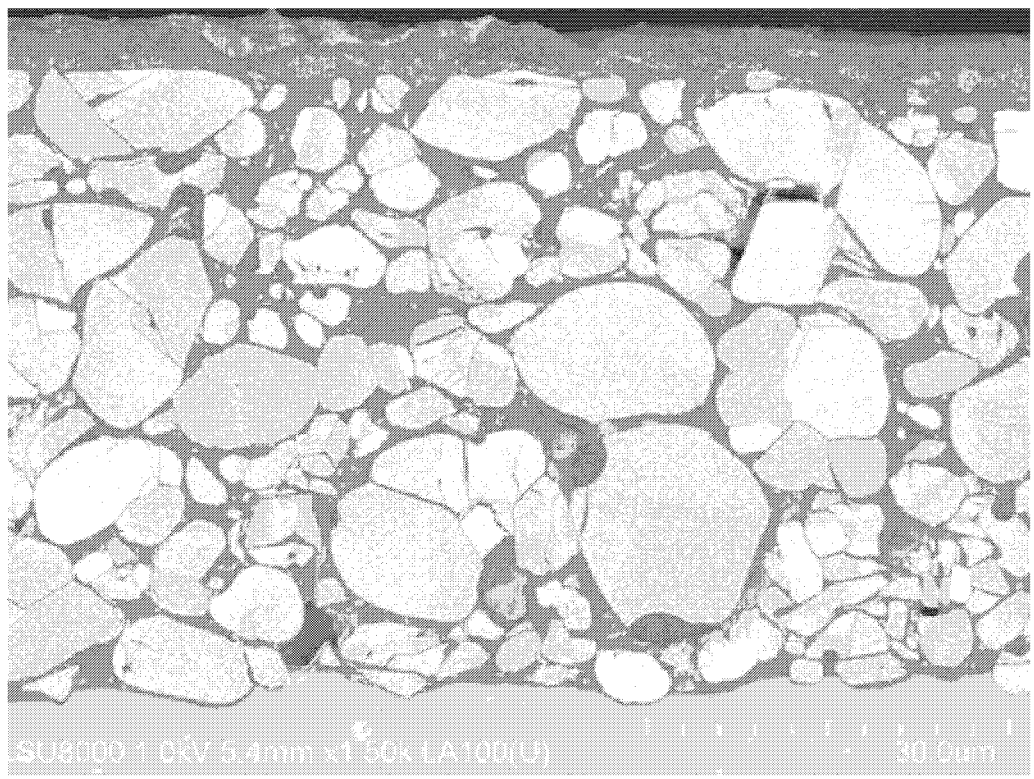
FIG. 7 shows a cross-sectional SEM image of a positive electrode formed as Example 3 after repeating a charge or discharge cycle 200 times, wherein the positive electrode is extracted from a secondary battery.

Further, as shown in FIGS. 6 and 7, referring to the cross section of the positive electrode active material included in the secondary battery after the charging and discharging cycles of the secondary battery, it can be seen that more cracks were generated in the positive electrode active material after the charging and discharging cycles (see FIG. 7) than before the charging and discharging cycles (see FIG. 6).

Experimental Example 2: Confirmation of Cracking Characteristics of Positive Electrode Active Material The cracking characteristics of the positive electrode active material, which are measured by the analysis methods of Examples 1 to 3 above, were confirmed, and are shown in Table 1.

TABLE 1

| | Boundary pixels (A) of active material | Surface area pixels (C) of active material | A/C*100 (%) |
|---|---|---|---|
| Example 1 | 38,255 | 587,556 | 6.51 |
| Example 2 | 44,595 | 587,556 | 7.59 |
| Example 3 | 46,913 | 587,556 | 8.24 |

As shown in Table 1, it can be seen that after the positive electrode was formed as Example 1, the positive electrode active material exhibited a crack rate of 6.51%. On the other hand, it can be seen that after the electrode was formed and then pressurized (in Example 2), the positive electrode active material exhibited a crack rate of 7.59%, and it can be seen that after the secondary battery including the positive electrode of Example 1 was charged and discharged (in Example 3), the positive electrode active material exhibited a crack rate of 8.24%. The cracking characteristics of the positive electrode active materials were quantitatively checked by utilizing the analysis methods of the present invention as described above.

According to the present invention, a degree of cracking of an electrode active material included in an electrode caused by charging/discharging or pressure can be quantitatively analyzed, and a degeneration rate of the electrode when the electrode is applied to a battery can be accurately predicted based on a result of the analysis.

What is claimed is:

1. An analysis method for a crack rate of an electrode active material of an electrode for a secondary battery, comprising the steps of:
    forming an electrode including an electrode active material, a binder, and a conductive material;
    impregnating the electrode with a resin and visualizing material regions including the electrode active material, the binder, and the conductive material which are included in the electrode, and a pore region;
    cutting the electrode and forming an electrode cross-section sample;
    photographing a cross section of the electrode cross-section sample using a scanning electron microscope and obtaining a cross-sectional image;
    performing primary image processing on the cross-sectional image and extracting total surface area pixels of the electrode active material;
    performing secondary image processing on the cross-sectional image and extracting total boundary pixels of the electrode active material; and
    calculating a crack rate of the electrode active material of the electrode in the cross-sectional image according to Equation 1, A crack rate (%) of an electrode active material={(the total boundary pixels of the electrode active material which are extracted from the cross-sectional image/the total surface area pixels of the electrode active material which are extracted from the cross-sectional image)×100}  [Equation 1].

2. The analysis method of claim 1, further comprising step of pressing the electrode and calculating a crack rate of the pressed electrode active material of the electrode in the cross-sectional image according to Equation 1.

3. The analysis method of claim 1, wherein the resin includes an epoxy-based resin.

4. The analysis method of claim 1, wherein the cutting of the electrode in the is performed by irradiating the electrode with an argon ion beam of an ion milling device.

5. The analysis method of claim 4, wherein an ion beam current of the ion milling device ranges from 10 µA to 250 µA.

6. An analysis method for a crack rate of an electrode active material of an electrode for a secondary battery, comprising the steps of:
    forming an electrode including an electrode active material, a binder, and a conductive material;
    impregnating the electrode with a resin and visualizing material regions including the electrode active material, the binder, and the conductive material which are included in the electrode, and a pore region;
    cutting the electrode and forming an electrode cross-section sample;
    photographing a cross section of the electrode cross-section sample using a scanning electron microscope and obtaining a cross-sectional image;
    performing primary image processing on the cross-sectional image and extracting total surface area pixels of the electrode active material;
    performing secondary image processing on the cross-sectional image and extracting total boundary pixels of the electrode active material;
    calculating a crack rate of the electrode active material of the electrode in the cross-sectional image according to Equation 1, A crack rate (%) of an electrode active material={(the total boundary pixels of the electrode active material which are extracted from the cross-sectional image/the total surface area pixels of the electrode active material which are extracted from the cross-sectional image)×100}  [Equation 1];

manufacturing a secondary battery including the electrode; and
    charging or discharging the secondary battery with a driving voltage of 3.0 to 4.2 V and then separating the electrode from the secondary battery, and
    recalculating the crack rate of the electrode active material of the separated electrode according to Equation 1.

* * * * *